United States Patent
Pohl

(10) Patent No.: US 8,030,415 B2
(45) Date of Patent: Oct. 4, 2011

(54) PROCESS FOR CROSSLINKING THERMOPLASTIC POLYMERS WITH SILANES EMPLOYING PEROXIDE BLENDS, THE RESULTING CROSSLINKED THERMOPLASTIC POLYMER COMPOSITION AND ARTICLES MADE THEREFROM

(75) Inventor: Eric R. Pohl, Mount Kisco, NY (US)

(73) Assignee: Momentive Performance Materials, Inc., Albany, NY (US)

( * ) Notice: Subject to any disclaimer, the term of this patent is extended or adjusted under 35 U.S.C. 154(b) by 0 days.

(21) Appl. No.: 12/724,594

(22) Filed: Mar. 16, 2010

(65) Prior Publication Data
US 2010/0204409 A1 Aug. 12, 2010

Related U.S. Application Data

(63) Continuation of application No. 11/598,906, filed on Nov. 14, 2006, now abandoned.

(51) Int. Cl.
  C08L 43/04 (2006.01)
  C08L 83/10 (2006.01)
  C08L 83/04 (2006.01)
  C08F 4/38 (2006.01)

(52) U.S. Cl. ........ 525/342; 526/228; 526/279; 525/284; 525/474; 525/387

(58) Field of Classification Search ................ 526/279, 526/228; 525/284, 342, 387, 474
  See application file for complete search history.

(56) References Cited

U.S. PATENT DOCUMENTS

| | | | |
|---|---|---|---|
| 3,646,155 A | 2/1972 | Scott et al. |
| 3,939,133 A | 2/1976 | Roodvoets |
| 4,048,129 A | 9/1977 | Voigt |
| 4,117,195 A | 9/1978 | Swarbrick et al. |
| 4,252,906 A | 2/1981 | Hosokawa et al. |
| 4,255,524 A | 3/1981 | Dawans et al. |
| 4,412,042 A | 10/1983 | Matsura et al. |
| 5,112,919 A | 5/1992 | Furrer et al. |
| 5,741,858 A | 4/1998 | Brann et al. |
| 5,744,553 A | 4/1998 | Kempter |
| 5,932,651 A | 8/1999 | Liles et al. |
| 6,455,637 B1 | 9/2002 | Jackson et al. |
| 6,864,323 B2 | 3/2005 | Schlosser et al. |
| 2003/0114604 A1 | 6/2003 | Schlosser et al. |
| 2004/0259991 A1 | 12/2004 | Cai |
| 2005/0059783 A1 | 3/2005 | Furrer et al. |
| 2005/0218551 A1 | 10/2005 | Halahmi |
| 2006/0178487 A1* | 8/2006 | Weller ........................ 525/331.9 |
| 2006/0223951 A1 | 10/2006 | Furrer et al. |
| 2006/0223952 A1 | 10/2006 | Furrer et al. |

FOREIGN PATENT DOCUMENTS

| | | |
|---|---|---|
| EP | 1288235 | 7/2002 |
| EP | 1541601 | 6/2005 |
| GB | 1586023 | 3/1987 |
| WO | WO2004005395 | 1/2004 |
| WO | WO2005007715 | 1/2005 |

OTHER PUBLICATIONS

"Peroxide Mengsel", Research Disclosure, Mason Publications vol. 502, No. 1, Feb. 1, 2006, (XP007135873).
International Search Report for PCT/US2007/023742.

* cited by examiner

Primary Examiner — Vasu Jagannathan
Assistant Examiner — Mark Kaucher
(74) Attorney, Agent, or Firm — Dominick C. Vicari; Joseph S. Ostroff

(57) ABSTRACT

A moisture crosslinkable thermoplastic composition is produced by a process of grafting an unsaturated silane of the formula:

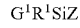

where $G^1$ is vinyl, $R^1$ is methyl and Z is a divalent hydrolyzable group under reactive mechanical working conditions and in the presence of at least two peroxides and subsequently is converted into a crosslinked thermoplastic composition by exposure to moisture in the presence of a crosslinking catalyst.

14 Claims, No Drawings

PROCESS FOR CROSSLINKING THERMOPLASTIC POLYMERS WITH SILANES EMPLOYING PEROXIDE BLENDS, THE RESULTING CROSSLINKED THERMOPLASTIC POLYMER COMPOSITION AND ARTICLES MADE THEREFROM

CROSS REFERENCE TO RELATED APPLICATIONS

The present application is a continuation of U.S. application Ser. No. 11/598,906, filed Nov. 14, 2006 now abandoned, to which priority is claimed and which is herein incorporated by reference in its entirety.

BACKGROUND OF THE INVENTION (1) Field of the Invention

This disclosure relates to a composition comprising a silane, and a system of peroxides and a process of crosslinking thermoplastic polymers with said composition. The disclosure further relates to the moisture crosslinked thermoplastic polymers resulting from the process and articles made therefrom.

(2) Description of Related Art

For many applications, e.g., wire and cable insulation, weatherstripping, fibers, seals, gaskets, foams, footware, flexible tubing, pipes, bellows, tapes, etc., certain selected properties (e.g. tensile strength, compression set, thermal and chemical resistance) of articles manufactured from one or more thermoplastic polymers can be enhanced by introducing chemical linkages between the polymeric molecular chains which constitute the polymer, during or specifically following, the shaping or molding process. These chemical linkages between different polymeric molecular chains are commonly referred to as "crosslinks". Crosslinks can be introduced between different molecular chains of a thermoplastic polymer by a number of mechanisms, one of which is to graft to the individual polymer backbones or chains that constitute the bulk polymer with a chemically reactive compound in such a manner that the grafted compound on one backbone may subsequently react with a similar grafted compound on another backbone to form the crosslink. Exemplary of this process is the "silane crosslinking" process.

The silane crosslinking process employs a silane-containing thermoplastic polymer that crosslinks when exposed to moisture. Silanes can be grafted onto a suitable thermoplastic polymer by the use of a suitable quantity of free radical initiator, either before or during a shaping or molding operation. Additional ingredients such as stabilizers, pigments, fillers, catalysts, processing aids etc., may also be included in the mixture.

When using practicing silane cross-linking for thermoplastic polymer, a compromise must be made between grafting efficiency and processing efficiency, such as extrusion rate and run times. The formation of a crosslinkable material by this means is, however, difficult to carry out since it requires critical control of the process. If the free radical initiator, for example, reacts too quickly with the thermoplastic polymer, then the thermoplastic polymer may partially crosslink and solidify in the processing apparatus, for example an extruder, with consequent difficulties in achieving consistent and good quality products and in avoiding delays involved in removing the partially crosslinked product from the processing equipment.

It has been observed that gel formation, screw-build up and scorching may result when using highly reactive silane crosslinking blends. This gel formation is particularly significant for processes using conditions and processing equipment that impose severe melting and mixing conditions leading to high shearing stresses in the thermoplastic polymer. These problems generally arise due to early and eventually complete activation of the free radical initiator during the initial melting and homogenization process. The prior art has dealt with these problems by using less reactive silane cross-linking blends but this approach can diminish the grafting efficiency of the crosslinkable thermoplastic polymers.

The silane compositions of the prior art can also generate volatile organic compounds in amounts that are a potential fire or explosion hazard and may be deleterious to the environment.

Thus, there remains a need for a means of crosslinking polyolefins and other silane crosslinkable thermoplastic polymers under reactive mechanical-working conditions using silane crosslinkers and free radical initiators while minimizing such aforenoted problems as gel formation, screw-buildup and/or scorching, fire or explosion hazards while maintaining a high level of grafting efficiency.

BRIEF SUMMARY OF THE INVENTION

In one embodiment herein, there is provided a composition comprising silanes with an unsaturated organic functional group and two hydrolyzable groups, and a system of at least two peroxides; and there is also provided herein a process of crosslinking thermoplastic polymers by reacting thermoplastic polymers with novel compositions of these silanes and system of at least two peroxides under reactive mechanical-working conditions.

In one embodiment herein, there is provided a composition comprising:

(i) one or more unsaturated silane compounds according to the Formula (1):

$$G^1R^1SiX^1X^2 \qquad (1)$$

wherein $G^1$ is an olefinically unsaturated hydrocarbon group, optionally heteroatom-substituted with one or more oxygen and/or nitrogen atoms; $R^1$ is selected from the group consisting of alkyl, aryl, aralkyl, and arenyl; each of $X^1$ and $X^2$ is independently a hydrolyzable group, or alternatively each of $X^1$ and $X^2$ is a hydrolyzable group having a direct bond to the silicon atom and also simultaneously a direct bond to each other to form a ring with the silicon atom of the unsaturated silane of Formula (1); and (ii) a system of at least two peroxides comprising a first peroxide having a first 0.1 hour half-life temperature and a second peroxide having a second 0.1 hour half-life temperature, the first and second 0.1 hour half-life temperatures in said composition having a temperature differential of at least about 5° C.

In another embodiment herein, there is provided a process for producing a silane-grafted thermoplastic polymer, the process comprising subjecting a composition comprising (i) one or more unsaturated silane compounds, (ii) a system of at least two peroxides, and (iii) one or more thermoplastic polymers, to conditions suitable for grafting of the unsaturated silane compound to the thermoplastic polymer to form a silane-grafted thermoplastic polymer, wherein the one or more unsaturated silane compounds are according to Formula (1):

$$G^1R^1SiX^1X^2 \qquad (1)$$

wherein $G^1$ is an olefinically unsaturated hydrocarbon group, optionally heteroatom-substituted with one or more oxygen and/or nitrogen atoms; $R^1$ is selected from the group consisting of alkyl, aryl, aralkyl and arenyl; each of $X^1$ and $X^2$ is independently a hydrolyzable group or alternatively each of $X^1$ and $X^2$ is a hydrolyzable group having a direct bond to the silicon atom and also simultaneously a direct bond to each other to form a ring with the silicon atom of the unsaturated silane of Formula (1); and the system of at least two peroxides comprising a first peroxide having a first 0.1 hour half-life temperature and a second peroxide having a second 0.1 hour half-life temperature, the first and second 0.1 hour half-life temperatures in said composition having a temperature differential of at least about 5° C.

In yet another embodiment, herein there is provided an article, produced by a process comprising:

a) providing a composition comprising:

(i) one or more unsaturated silane compounds according to the Formula (1):

$$G^1R^1SiX^1X^2 \qquad (1)$$

wherein $G^1$ is an olefinically unsaturated hydrocarbon group, optionally heteroatom-substituted with one or more oxygen and/or nitrogen atoms; $R^1$ is selected from the group consisting of alkyl, aryl, aralkyl and arenyl; each of $X^1$ and $X^2$ is independently a hydrolyzable group, or alternatively each of $X^1$ and $X^2$ is a hydrolyzable group having a direct bond to the silicon atom and also simultaneously a direct bond to each other to form a ring with the silicon atom of the unsaturated silane compound of Formula (1);

(ii) a system of at least two peroxides comprising a first peroxide having a first 0.1 hour half-life temperature and a second peroxide having a second 0.1 hour half-life temperature, the first and second 0.1 hour half-life temperatures in said composition having a temperature differential of at least about 5° C.; and (iii) one or more thermoplastic polymers;

b) subjecting the composition of step (a) to conditions suitable for grafting of the unsaturated silane compound to the thermoplastic polymer to form a silane-grafted thermoplastic polymer;

c) subjecting the silane-grafted thermoplastic polymer of step (b) to conditions suitable for crosslinking of the silane-grafted thermoplastic polymer to form a crosslinked thermoplastic polymer; and, d) producing the article therefrom before, and/or during and/or after conducting step (c), wherein the conditions for silane grafting according to step (b) and for crosslinking according to step (c) are the same or different, and wherein, optionally in one embodiment steps (b) and (c) are conducted simultaneously or consecutively.

DETAILED DESCRIPTION OF THE INVENTION

The expression "reactive mechanical-working conditions" herein shall be understood to mean the conditions within a mechanical working apparatus, such as an extruder, of elevated temperature and sufficient residence time to bring about reactive processing which include activating the herein described system of at least two peroxides and graphing the herein described unsaturated silane onto the herein described thermoplastic polymer.

It will be understood that all ranges stated herein comprise all subranges there between and can further comprise any combination of ranges and/or subranges.

It will be understood that unless stated otherwise, all percents are weight percents based on the total weight percent of the herein described composition.

In one embodiment herein, the unsaturated silane compounds according to the Formula (1) can comprise specifically at least one compound of the Formula (1) and more specifically at least two different compounds of the Formula (1). In one specific embodiment herein, $G^1$ represents an olefinically unsaturated hydrocarbon group, that is optionally hetero-atom substituted with one or more oxygen and/or nitrogen atoms. In one more specific embodiment, $G^1$ contains of from about 2 to about 20 carbon atoms, more specifically of from about 2 to about 18 carbon atoms, even more specifically of from about 2 to about 12 carbon atoms, yet even more specifically of from about 2 to about 10 carbon atoms and most specifically of from about 2 to about 6 carbon atoms. As used herein, $G^1$ is an unsaturated hydrocarbon group that contains at least one carbon-carbon double bond. Herein, $G^1$ can be optionally substituted with one or more oxygen and/or nitrogen atoms, more specifically at least one oxygen atom and at least one nitrogen atom, and even more specifically two or more oxygen atoms and/or two or more nitrogen atoms. The olefinically unsaturated hydrocarbon group of $G^1$ that is heteroatom substituted can comprise where the heteroatom is part of an ester group ($-CO_2-$), ether group ($-O-$), ketone group ($-C(=O)-$), amide group ($-C(=O)N(-)_2$) and/or an imide group ($-C(=O)N(-)C(=O)-$) group. Some specific examples of $G^1$ include, but are not limited to alkenyl groups, such as the non-limiting examples vinyl, allyl, butenyl, cyclohexenyl, cyclopentenyl, and 2-[4-(2-propenyl)phenyl]ethyl; alpha,beta-unsaturated carbonyl groups, such as the non-limiting examples 3-methacryloxypropyl, 1-methacryloxymethyl, 5-methacryloxy-3-oxapentyl, 6-methacryloxy-3-oxahexyl, 3-acryloxypropyl, 1-acryloxymethyl,

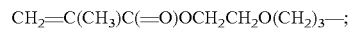

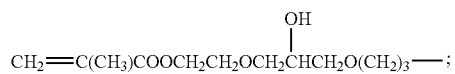

and vinyl substituted aryl groups, such as the non-limiting examples styryl and 4-vinylbenzyl.

In one embodiment herein, $R^1$ is can be selected from the non-limiting examples of alkyl, aryl, aralkyl, and arenyl. More specifically, as used herein, "alkyl" includes straight, branched and cyclic alkyl (cycloalkyl) groups, as well as cyclic alkyl groups that are branched; "aryl" includes any aromatic hydrocarbon from which one hydrogen atom has been removed; "aralkyl" includes, but is not limited to, any of the aforementioned alkyl groups in which one or more hydrogen atoms have been substituted by the same number of like and/or different aryl (as defined herein) substituents; and "arenyl" includes any of the aforementioned aryl groups in which one or more hydrogen atoms have been substituted by the same number of like and/or different alkyl (as defined herein) substituents. When $R^1$ herein is alkyl, $R^1$ can contain of from 1 to about 30 carbon atoms, more specifically of from 1 to about 20 carbon atoms, even more specifically of from 1 to about 12 carbon atoms and most specifically of from 1 to about 6 carbon atoms, provided that when $R^1$ is a branched alkyl group $R^1$ contains at least 3 carbon atoms. In another embodiment, $R^1$ is a cyclic alkyl group that contains at least 3 carbon atoms and specifically wherein $R^1$ is a branched cyclic alkyl group $R^1$ contains at least 4 carbon atoms. When $R^1$ is cycloalkyl (branched or unbranched) herein, $R^1$ can contain specifically of from 6 to about 8 carbon atoms. When $R^1$ is aryl herein, $R^1$ can contain of from 6 to about 30 carbon atoms, more specifically of from 6 to about 20 carbon atoms, even more specifically of from 6 to about 12 carbon atoms and most specifically of from 6 to about 8 carbon atoms. When $R^1$ is aralkyl or arenyl herein, $R^1$ can contain of from 7 to about 30 carbon atoms, more specifically of from 7 to about 20 carbon atoms, and most specifically of from 7 to about 12 carbon atoms. Some specific non-limiting examples of $R^1$, that are alkyls, include, but are not limited to, methyl, ethyl, propyl, isopropyl, butyl, hexyl, octyl, ethylcyclohexyl, norbornyl, cyclopentyl, and cyclohexyl and most specifically methyl and ethyl. Some specific non-limiting examples of $R^1$ that are aryls include, but are not limited to, phenyl and napthalenyl. In one other specific embodiment some specific non-limiting examples of $R^1$ that are aralkyls include, but are not limited to, benzyl and phenethyl. In yet a further embodiment some specific examples of $R^1$ that are arenyls include, but are not limited to, tolyl and xylyl. The $R^1$ group as described herein does not contain any crosslinkable moiety in any embodiments herein, and $R^1$ does not contain any unsaturation that can be used in graphing as described herein.

In a more specific embodiment herein, in Formula (1), each $X^1$ and $X^2$ independently represents a hydrolyzable group, wherein each of $X^1$ and $X^2$ has a direct bond to the silicon atom and also simultaneously a direct bond to each other to form a ring with the silicon atom of the unsaturated silane of Formula (1). In one specific embodiment herein $X^1$ and $X^2$ are not bonded directly to each other and are hydrolyzable groups. In another specific embodiment herein, $X^1$ and $X^2$ have a direct bond to each other as described above.

$X^1$ and $X^2$ when not having a direct bond to each other can each independently represent the same or different hydrolyzable organic group such as an alkoxy group containing of from 1 to about 30 carbon atoms, more specifically of from 1 to about 20 carbon atoms, even more specifically of from 1 to about 12 carbon atoms and most specifically of from 1 to about 6 carbon atoms, such as the non-limiting examples of methoxy, ethoxy, propoxy, isopropoxy, butoxy, isobutoxy groups; acyloxy group containing of from 1 to about 30 carbon atoms, such as the non-limiting examples of formyloxy, acetoxy, propanoyloxy, benzoyloxy and octanoyloxy groups; oximato groups containing of from 1 to about 30 carbon atoms, such as —ON=C(CH$_3$)$_2$, —ON=C(CH$_3$)CH$_2$CH$_3$, —ON=C(CH$_3$)CH$_2$CH$_3$ and —ON=C(C$_6$H$_5$)$_2$ groups; or substituted amino groups containing of from 1 to about 30 carbon atoms, such as alkylamino and arylamino groups, some non-limiting examples of which are —NHCH$_3$, —NHC$_2$H$_5$ and —NH(C$_6$H$_5$). $X^1$ and $X^2$ herein when not having a direct bond to each other are each independently methoxy or ethoxy.

In one embodiment herein of Formula (1), each $X^1$ and $X^2$ have a direct bond to the silicon atom and a direct bond to each other to form a ring with the silicon atom of the unsaturated silane of Formula (1) by any chemical method and/or reaction that will result in the formation of silicon-containing ring that contains a bond of any element in $X^1$ to any element in $X^2$. Such a ring can contain a group (such as the non-limiting example of Z described herein) which is the result of any chemical method and/or reaction that results in the direct bond of $X^1$ and $X^2$ to each other; so that thereby such a group can contain the bonded reaction product of at least two of the groups identified above for $X^1$ and $X^2$ when $X^1$ and $X^2$ do not have a direct bond to each other. In another embodiment herein, $X^1$ and $X^2$ of Formula (1) have a direct bond to silicon and to each other to form a silicon-containing ring by the non-limiting example of the chemical method of removal of a hydrogen atom that was previously directly bonded to a carbon atom in $X^1$ and $X^2$, from each of $X^1$ and $X^2$ respectively and thus allowing the bonding of the two respective carbon atoms in $X^1$ and $X^2$ that had hydrogen removed therefrom. In yet a further embodiment, $X^1$ and $X^2$ of Formula (1) have a direct bond to silicon and to each other to form a silicon-containing ring by the non-limiting example of the chemical method of removal of a hydrogen atom that was previously directly bonded to an atom other than a carbon atom in $X^1$ and a hydrogen atom that was previously bonded to a carbon atom in $X^2$, from each of $X^1$ and $X^2$ respectively, and thus allowing the bonding of the respective non-carbon atom and carbon atom in $X^1$ and $X^2$ respectively that each had a hydrogen atom removed therefrom.

In one specific embodiment, unsaturated silane compound of the general Formula (1) when $X^1$ and $X^2$ have a direct bond to each other as described above, can have the more specific Formula (2):

$$G^1R^1SiZ \qquad (2)$$

wherein $G^1$ and $R^1$ are as defined above and wherein the Z group is a divalent hydrolyzable group that forms a cyclic structure with the silicon atom of formula (2). In one embodiment Z of general formula (2) that forms a cyclic structure with the silicon atom of formula (2) is a divalent hydrolyzable group of specifically from 2 to about 30 carbon atoms, more specifically from 2 to about 18 carbon atoms and most specifically from about 2 to about 12 carbon atoms. In another specific embodiment Z of general formula (2) is a divalent hydrolyzable alkanedioxy group that has the general Formula (3):

$$\text{—O}(R^2CR^2)_cO\text{—} \qquad (3)$$

wherein each occurrence of $R^2$ is hydrogen or $R^1$ as defined above and wherein c is an integer of from 2 to 6, specifically 2 or 3. In one specific embodiment herein, when each of $X^1$ and $X^2$ of Formula (1) have a bond to each other, as described herein, they result in the formation of the above described Z group. In one more specific embodiment of the Z group, at least two $R^2$ groups are not hydrogen. Some specific examples of Z group include, but are not limited to, 2,3-butanedioxy, 2-methyl-1,2-propanedioxy, 2,3-hexanedioxy; 2,2-dimethyl-1,3-propanedioxy, 2-methyl-2,4-pentanedioxy, 2,3-dimethyl-2,3-butanedioxy, and 2,4-dimethyl-2,4-pentanedioxy.

In another embodiment, the unsaturated compounds of Formula (2) are formed by the transesterification of unsaturated compounds of Formula (1), wherein $X^1$ and $X^2$ are not interconnected to each other, in which said transesterification results in $X^1$ and $X^2$ being replaced by a divalent hydrolyzable alkanedioxy group, such as the non-limiting example of formula (3) and wherein the two oxygen atoms of the structure in Formula (3) are bonded directly to the silicon atom of the unsaturated silane of Formula (2). In one embodiment Formula (2) can be formed by transesterification of the silane of Formula (1), wherein $X^1$ and $X^2$ are not connected to each other, with an alkanediol and optionally in the presence of a transesterification catalyst, such as para-toluenesulfonic acid, in which said transesterification results in $X^1$ and $X^2$ being replaced by a divalent hydrolyzable alkanedioxy group such as the non-limiting example of formula (3) wherein the two oxygen atoms of the structure in Formula (3) are bonded directly to the silicon atom of the unsaturated silane of Formula (2). The term "alkanediol" as used herein refers to an alkane in which two hydrogens have been substituted with two hydroxyl groups and is also commonly referred to as glycol or diol. The preparation of unsaturated silanes of Formula (2) is disclosed in U.S. Patent Application 2006/0036034A1, which is incorporated herein by reference in its entirety.

The structure of Z is important in the formation of the silicon-containing cyclic structure. $R^2$ groups that are more sterically hindered than hydrogen promote the formation of the ring containing Z and the silicon atom. $R^2$ groups that are more sterically hindered than hydrogen can be the non-limiting examples of specifically, alkyl groups of from 1 to about 18 carbon atoms, more specifically of from 1 to about 3 carbon atoms and most specifically methyl. $R^2$ groups other than hydrogen that can be used herein are alkyl groups, such as the non-limiting examples of methyl, ethyl, n-propyl, iso-propyl, butyl, octyl and dodecyl; aryl groups such as the non-limiting examples of phenyl or napthalenyl; aralkyl groups, such as the non-limiting examples of benzyl or 2-phenylethyl; and arenyl groups, such as the non-limiting examples of tolyl and xylyl. The attachment of two $R^2$ groups to a single carbon atom results in a "gem dihydrocarbyl group". Gem dihydrocarbyl group(s) further promote the formation of a ring containing a silicon atom and Z, a divalent alkanedioxy group such as the non-limiting group of Formula (3). Some non-limiting examples of a gem dihydrocarbyl group are selected from the group consisting of alkyl, aryl, aralkyl and arenyl groups described herein. The formation of a ring structure containing a silicon atom and the Z, alkanedioxy group such as the non-limiting example of Formula (3) is also promoted when the values of c is 2 or 3 because the size of the ring then becomes 5 or 6, which promotes a more stable ring structure. It is undesirable when the two oxygens of the Z group are attached to a different silicon atom in that it would form a silane that has two silicon atoms that are connected by the Z group and two unsaturated organic groups. During the reactive mechanical-working conditions, these silanes containing two unsaturated organic groups will crosslink the thermoplastic polymer described herein within the mechanical-working apparatus and cause scorch.

The unsaturated silane of Formula (1) can contain only two hydrolyzable organic groups or in the instance where $X^1$ and $X^2$ have a direct bond to silicon and a direct bond to each other as described herein, one group in which a hydrogen atom of each of $X^1$ and $X^2$ has been replaced by an oxa (—O—) group and wherein each oxa group is bonded to the $X^1$ and $X^2$ and to the silicon atom.

The unsaturated silane of Formula (1) as described above can have one olefinically unsaturated group and two hydrolyzable groups attached to the silicon atom or the instance where $X^1$ and $X^2$ have a direct bond to silicon and a direct bond to each other as described herein.

When these silanes described herein are graphed onto the thermoplastic polymers described herein and crosslinked, the polymer chains are connected to each other at crosslink points containing three tie points. The thermoplastic crosslinked polymers described herein will have higher elongations and are more flexible than thermoplastic polymers crosslinked with molar equivalent amounts of silanes outside of the scope of the disclosure herein, which possess one unsaturated group and three hydrolyzable groups or with two unsaturated groups and two hydrolyzable groups, wherein said unsaturated group(s) and hydrolyzable groups are the same group as is used in Formula (1) or (2). The crosslinked thermoplastic polymers made using silanes of the general Formulae (1) or (2) have an elongation of specifically from about 1 to about 100 percent, more specifically of from about 1 to about 50 percent, and most specifically of from about 1 to about 20 percent higher than thermoplastic polymers crosslinked with a molar equivalent amount of silanes possessing one unsaturated group and three hydrolyzable groups, or silanes possessing two unsaturated groups and two hydrolyzable groups, wherein said unsaturated group(s) and hydrolyzable groups are the same group as is used in Formula (1) or (2). In one specific embodiment herein, the crosslinked thermoplastic polymers made using silanes of the general Formula (2) have a reduced level of volatile organic compound (VOC) emission of specifically from about 30 to about 100 percent, more specifically of from about 66 to about 100 percent, and most specifically of from about 85 to about 100 percent lower than thermoplastic polymers crosslinked with a molar equivalent amount of silanes with one unsaturated group and three hydrolysable groups, such as the low molecular weight alkoxy groups (e.g. methoxy or ethoxy), that are commonly used; or silanes possessing two unsaturated groups and two hydrolyzable groups, wherein said unsaturated groups and hydrolyzable groups are the same group as is used in Formula (1) wherein $X^1$ and $X^2$ are not bonded directly to each other. The reduced levels of VOC's are due to the high boiling points of the alkanediols that are generated after the silane of Formula (2) reacts with moisture. These high boiling alkanediols do not readily evaporate during processing and after the polymer is crosslinked. In one embodiment herein, any composition, process or article described herein has the same levels of reduced VOC as described above. Elongation is determined herein by the method described in ASTM D-638. In one specific embodiment herein the crosslinked thermoplastic polymers made using silanes of the general Formulae (1) and/or (2) are more flexible, as determined by a lower modulus, and specifically have a modulus from about 1 to about 200 percent, more specifically of from about 5 to about 50 percent, and most specifically of from about 10 to about 25 percent lower modulus than polymers crosslinked with a molar equivalent of silanes possessing one unsaturated group and three hydrolyzable groups or silanes possessing two unsaturated groups and two hydrolyzable groups, wherein said unsaturated group(s) and hydrolyzable groups are the same group as is used in Formula (1) or (2). Modulus is determined herein by the method described in ASTM D-638. These later polymers, which are outside the current disclosure, are crosslinked with silanes outside of the scope of this disclosure which possess one unsaturated group and three hydrolyzable groups or possess two unsaturated groups and two hydrolyzable groups have crosslinks that have four tie points. In addition, the silanes possessing two unsaturated groups and two hydrolyzable groups, which are outside of this disclosure, can undergo the graphing reactions with two different polymer chains. The silane with two unsaturated groups and two hydrolyzable groups, which are outside of this disclosure can therefore bond two polymer chains together during graphing reactions and thus significantly and undesirably increase the molecular weight of the polymer. The resulting silane graphed polymers from silanes with two unsaturated groups and two hydrolyzable groups, which are outside of this disclosure, will have a significant decrease in melt flow index which will make them more difficult to process and mold. In one specific embodiment herein, the two hydrolysable groups $X^1$ and $X^2$ of the silanes of Formula (1) are also more important if $X^1$ and $X^2$ are connected such as is the case in one non-limiting example of Formula I and also in Formula (2). In one embodiment herein, the connected $X^1$ and $X^2$ group is represented by Z. The Z groups herein can readily form cyclic structures, especially if the Z group contain more sterically hindered substituents other than hydrogen, such as $R^1$, as is described above. If the unsaturated silane herein contained three hydrolyzable groups, which is outside the scope of the disclosure herein, then two Z groups could react with a single silicon atom; one of the Z groups would form a cyclic structure; the second Z group could form a bridge between two different silicon atoms. These bridged structures that contain two unsaturated groups are capable of graphing reactions with two different polymer chains. Bonding two different polymer chains together in the graphing reactions increase the polymers molecular weight and decreases the melt flow index, resulting in the problems of scorch such as is discussed above.

In one specific embodiment herein, the unsaturated silane compound of Formula (1) is characterized in that $G^1$ is vinyl or allyl, $R^1$ is straight alkyl having from 1 to about 6 carbon atoms, a branched alkyl having from 3 to 6 carbon atoms, or a unbranched cycloalkyl group of from 6 to about 8 carbon atoms, or a branched cycloalkyl of from 6 to 8 carbon atoms and each of $X^1$ and $X^2$ is independently an alkoxy group having from one to six carbon atoms.

In one embodiment some non-limiting examples of silanes of the general Formula (1) include vinylmethyldimethoxysilane, vinylmethyldiethoxysilane, vinylmethyldiethoxysilane, vinylethyldiethoxysilane, 3-methacryloxypropylmethyldimethoxysilane, N-(3-methyldimethoxysilylpropyl) methacrylamide and combinations thereof.

In another specific embodiment herein the unsaturated silane compound of Formula (2) is characterized in that $G^1$ is vinyl or allyl, $R^1$ is a straight alkyl group having from 1 to about 6 carbon atoms, a branched alkyl having from 3 to 6 carbon atoms, or an unbranched cycloalkyl group of from 6 to about 8 carbon atoms or a branched cycloalkyl of from 6 to 8 carbon atoms and Z is a alkanedioxy group having specifically from 2 to 12 carbon atoms, more specifically from 2 to about 8 carbon atoms and most specifically from 2 to about 6 carbon atoms.

In yet another specific embodiment herein the unsaturated silane compound of Formula (2) is 2,4,4,6-tetramethyl-2-vinyl-[1,3,2]dioxasilinane; 2-methyl-5,5-diethyl-2-vinyl-[1,3,2]dioxasilinane, 2-phenethyl-5,5-diethyl-2-vinyl-[1,3,2]dioxasilinane, 2-methyl-5-ethyl-2-vinyl-[1,3,2]dioxasilinane, 2,4,4,6-tetramethyl-2-(3-methacryloxypropyl)-[1,3,2]dioxasilinane, 2-methyl-5,5-diethyl-2-(3-methacryloxypropyl)-[1,3,2]dioxasilinane, 2-phenethyl-5,5-diethyl-2-(1-methacryloxymethyl)-[1,3,2]dioxasilinane, 2-methyl-5-ethyl-2-(2-methacryloxyethyl)-[1,3,2]dioxasilinane and combinations thereof.

In one embodiment herein the above described system of peroxides comprises a first peroxide having a first 0.1 hour half-life temperature and a second peroxide having a second 0.1 hour half-life temperature, the first and second 0.1 hour half-life temperature having a temperature differential of specifically at least about 5 degrees Celsius (° C.), more specifically at least about 15° C. and most specifically at least about 30° C.

The system of peroxides possesses a differential of 0.1 hour half-life temperatures, as described herein, such that undesired early and/or concentrated activation of the system of peroxides is decreased; further, the differential of 0.1 hour half-life temperature allows for a controlled level of activation and grafting throughout the reactive processes described herein, which leads to an improved level of grafting efficiency and silane crosslinking efficiency in the grafted and/or crosslinked thermoplastic polymers described herein. The use of peroxides containing a range of 0.1 hour half-life temperatures, as described herein, has been observed to reduce the level of gel formation, screw buildup and/or scorching allowing for extended run-times.

In one embodiment herein, the amount of gel formation obtained after crosslinking the silane-graphed thermoplastic polymer compositions described herein is specifically of from about 10 to about 100 weight percent, more specifically of from about 50 to about 99 weight and most specifically of from about 75 to about 95 weight percent, said weight percents being based on the total weight of the composition.

The system of peroxides comprises specifically at least two peroxides, more specifically at least three peroxides and most specifically at least four peroxides. In another embodiment herein, the 0.1 hour half-life temperature of the second peroxide is between 5° C. and 110° C. greater than the 0.1 hour half-life temperature of the first peroxide. In yet another embodiment, the 0.1 hour half-life temperature of the second peroxide is between 30° C. to 90° C. greater than the 0.1 hour half-life temperature of the first peroxide. In still another embodiment, the 0.1 hour half-life temperature of the second peroxide is between 45° C. and 70° C. greater than the 0.1 hour half-life temperature of the first peroxide.

In one embodiment, the first peroxide possesses a relatively low 0.1 hour half-life temperature, of specifically from about 80° C. to about 160° C., more specifically of from about 90° C. to about 155° C. and most specifically of from about 100° C. to about 135° C. In one embodiment, the specific peroxide 0.1 hour half life temperature(s) indicated herein are calculated using the data and formulae provided in the downloadable Arkema spreadsheet found at the website address of arkema-inc.com/index.cfm?pag=353 by downloading the link which is highlighted as "Download Half-Life Selection Guide" on said webpage, and using the formula presented in the "Classical Plot" page in said Half-Life Selection Guide, for the cell identified as the 6 minutes (0.1 hour) half-life, which is used with the data for Activation Energy (Ea (kcal/gmole)) and A constant (A(1/sec)) being provided for individual peroxides on the separate page in said Half Life Selection Guide entitled Data and Configure. By utilizing the appropriate Activation Energy and A constant data for a particular peroxide, in the formula, one obtains a value for the 0.1 hour half-life temperature of the peroxide in the respective solvent indicated in the spreadsheet Data and Configure. The formula which was used for determining the specifically provided 0.1 hour half-life temperature of the peroxides herein is identified the "Classical Plot" page in said Half-Life Selection Guide, for the cell identified as the 6 minutes (0.1 hour) half-life and is:
(Activation Energy/0.001987)/LN((A Constant multiplied by 360)/0.693))−273.15. It will also be understood herein that other conventionally known techniques for determining 0.1 hour half-life of a particular peroxide can be used to obtain a respective 0.1 hour half-life temperature of a respective peroxide. LN is understood to be natural logarithm. Some suitable first peroxides and their range of 0.1 hour half-life temperatures are set forth in Table I as follows.

TABLE I

| First Peroxide | |
|---|---|
| First Peroxide | 0.1 hour half-life temperatures, ° C. |
| Bis-(2,4-dichlorobenzoyl) peroxide | 93 |
| Dilauroyl peroxide | 99 |
| Dibenzoyl peroxide | 113 |

TABLE I-continued

First Peroxide

| First Peroxide | 0.1 hour half-life temperatures, ° C. |
|---|---|
| 1,1-Bis-(tert-butylperoxy)-3,3,5-trimethylcyclohexane | 128 |
| Tert-butyl peroxybenzoate | 142 |
| Dicumyl peroxide | 154 |

In another embodiment herein some additional first peroxides can include tert-butyl peroxypivalate, tert-butyl peroxy-2-ethylhexanoate, bis-(tert-butyl peroxy)cyclohexane, tert-butyl peroxy-3,5,5-trimethylhexanoate, tert-butyl peroxyacetate, di-tert-amyl peroxide, bis-(tert-butyl peroxyisopropyl)benzene and 2,5-dimethyl-2,5-di-(tert-butyl peroxy)hexane, as well as any peroxide that is conventionally used or known. In one embodiment herein, first peroxide can comprise a combination of any of the herein described first peroxides.

In one embodiment, the second peroxide possesses a higher 0.1 hour half-life temperature than that of the first peroxide, specifically the 0.1 hour half-life temperatures of the second peroxide are on the order of from about 125° to about 190° C., more specifically from about 140° to about 170° C. and most specifically of from about 155° C. to about 165° C. In another embodiment some suitable second peroxides and their range of 0.1 hour half-life temperatures are set forth in Table II as follows.

TABLE II

Second Peroxides

| Second Peroxide | 0.1 hour half-life temperatures, ° C. |
|---|---|
| Tert-butyl peroxybenzoate | 142 |
| Dicumyl peroxide | 154 |
| Tert-butyl cumyl peroxide | 159 |
| 2,5-Dimethyl-2,5-bis-(tert-butyl peroxy)3-hexyne | 164 |

In a further embodiment, some additional second peroxides that can be used in addition to one or more of the above described second peroxides can include but are not limited to tert-butyl peroxy acetate, di-tert-amyl peroxide, bis-(tert-butyl peroxyisopropyl)benzene, 2,5-dimethyl-2,5-bis-(tert-butyl peroxy)hexane and di-tert-butyl peroxide, as well as any peroxide that is conventionally used or known. In one embodiment herein, second peroxide can comprise the combination of any of the herein described second peroxides. In the system of peroxides herein at least one first peroxide and at least one second peroxide are different peroxides.

In another embodiment herein the above described composition comprising one or more unsaturated silane compounds of the Formulae (1) and/or (2) and the system of at least two peroxides, can further comprise one or more thermoplastic polymers. The thermoplastic polymer used herein is a crosslinkable thermoplastic polymer.

The thermoplastic polymer can be a polyolefin, such as, one or more á-olefins, á-olefin copolymers, á-olefin terpolymers and mixtures thereof. In one more specific embodiment, the thermoplastic polymer comprises one or more polyolefins wherein the one or more polyolefins are polyethylene polymers or copolymers.

Some non-limiting examples of polyolefins that can be used herein include high-pressure low-density polyethylene, medium/low-pressure high-density polyethylene, low-pressure low-density polyethylene, medium-density polyethylene, an ethylene-α-olefin copolymer, polypropylene, an ethylene-ethyl acrylate copolymer, an ethylene-vinyl acetate copolymer, an ethylene-propylene copolymer, an ethylene-propylene-diene terpolymer, an ethylene-butene copolymer, polymethylpentenepolybutene, chlorinated polyethylene, an ethylene-vinyl acetate-chlorine terpolymer, and the like, and mixtures thereof.

In one more embodiment herein, the herein described composition comprising one or more unsaturated silane compounds of the Formulae (1) and/or (2), the system of at least two peroxides and a thermoplastic polymer can further optionally comprise one or more additional components capable of inhibiting silane grafting and/or crosslinking during storage. In one embodiment herein, any of the compositions herein can be stored in the absence of moisture. The compositions herein can further comprise one or more additional components capable of inhibiting silane grafting and/or crosslinking during storage wherein said additional components are such as the non-limiting examples of a free-radical inhibitor, free-radical stabilizer and/or free-radical scavenger. Some specific non-limiting examples of free-radical inhibitors are selected from the group consisting of phosphite, such as the non-limiting examples of tris-2,4-di-tert-butylphenyl) phosphite, tris-[2,4-di-(1,1-dimethylpropyl)phenyl]phosphite, tris-(2-phenylphenyl)phosphite, tris (2-cyclohexylphenyl)phosphite; single 2,6-dialkylphenols, such as the non-limiting examples of 2,6-di-tert-butyl-4-methoxyphenol, 2,6-di-tert-butyl-4-methoxymethylphenol; bisphenols, such as the non-limiting examples of 2,2'-methylene-bis-(6-tert-butyl-4-methylphenol), 2,2'-methylene-bis-(6-tert-butyl-4-ethylphenol), 2,2'-methylene-bis-[4-methyl-6-(alpha-methylcyclohexyl)phenol], 1,1-bis-(5-tert-butyl-4-hydroxy-2-methylphenyl)butane, 2,2-bis-(3,5-tert-butyl-4-hydroxyphenyl)propane; and hydroxyphenyl aromatics, such as the non-limiting examples of 1,3,5-tri-(3,5-di-tert-butyl-4-hydroxybenzyl)-2,4,6-trimethoxybenzene, dioctadecyl 2,2-bis-(3,5-di-tert-butyl-4-hydroxybenzyl)malonate, pentaerythrityl [3-(3,5-di-tert-butyl-4-hydroxyphenyl) propionate], stearyl 3-(3,5-di-tert-butyl-4-hydroxyphenyl) propionate and combinations thereof. Other free-radical inhibitors are disclosed in U.S. Pat. No. 4,187,212 which is incorporated herein by reference in its entirety. Some specific non-limiting examples of free-radical scavengers are selected from the group consisting of pentaerythrityl [3-(3,5-di-tert-butyl-4-hydroxyphenyl)propionate], stearyl 3-(3,5-di-tert-butyl-4-hydroxyphenyl)propionate and tris-2,4-di-tert-butylphenyl)phosphate and combinations thereof. In one other embodiment herein, the compositions herein can further comprise moisture, which can be present as indicated herein.

In another embodiment herein, the composition described herein further comprises optionally one or more crosslinking catalysts which accelerate the hydrolysis of the alkoxysilyl groups and/or condensation of the resulting silanol groups that are graphed onto thermoplastic polymer; and, still even further optionally, additives such as the non-limiting examples of antioxidants, processing aids, oils, plasticizers, fillers, colorants, pigments and lubricants.

A wide variety of materials which function as crosslinking catalysts for silanes are known in the art and any of such materials may be employed herein. Some non-limiting examples of crosslinking catalysts include metal carboxylates such as dibutyltin dilaurate, stannous acetate, stannous octanoate, lead naphthenate, zinc octanoate, iron-2-ethylhexanoate and cobalt naphthenate; organic metal compounds such as the titanium esters and chelates, for example tetrabutyl titanate, tetra-nonyl titanate and bis-(acetylacetonyl) di-isopropyl titanate; organic bases such as ethylamine, hexylamine, dibutylamine and piperidine; and acids such as the mineral acids and fatty acids; and combinations of any of the foregoing crosslinking catalysts. Crosslinking catalysts are more specifically, the organic tin compounds, for example, the non-limiting examples of dibutyltin dilaurate, dibutyltin diacetate, dibutyltin dioctanoate, and combinations thereof.

In one specific embodiment herein, there is provided a composition comprising:

(i) one or more silane compounds according to the Formula (1):

$$G^1R^1SiX^1X^2 \qquad (1)$$

wherein $G^1$ is an olefinically unsaturated hydrocarbon group, optionally heteroatom-substituted with one or more oxygen and/or nitrogen atoms; $R^1$ is selected from the group consisting of alkyl, aryl, aralkyl and arenyl; each of $X^1$ and $X^2$ is independently a hydrolyzable group, or alternatively each of $X^1$ and $X^2$ is a hydrolyzable group having a direct bond to the silicon atom and also simultaneously a direct bond to each other to form a ring containing the silicon atom of the unsaturated silane of Formula (1);

(ii) a system of at least two peroxides comprising a first peroxide having a first 0.1 hour half-life temperature and a second peroxide having a second 0.1 hour half-life temperature, the first and second 0.1 hour half-life temperatures in said composition having a temperature differential of at least about 5° C.; and (iii) one or more thermoplastic polymers;

the composition optionally containing one or more additional components capable of inhibiting silane grafting and/or crosslinking during storage.

In another embodiment herein, there is provided a composition comprising:

(i) one or more unsaturated silane compounds according to the Formula (1):

$$G^1R^1SiX^1X^2 \qquad (1)$$

wherein $G^1$ is an olefinically unsaturated hydrocarbon group, optionally heteroatom-substituted with one or more oxygen and/or nitrogen atoms; $R^1$ is selected from the group consisting of alkyl, aryl, aralkyl and arenyl; each of $X^1$ and $X^2$ is independently a hydrolyzable group or alternatively each of $X^1$ and $X^2$ is a hydrolyzable group having a direct bond to the silicon atom and also simultaneously a direct bond to each other to form a ring containing a silicon atom of the unsaturated silane of Formula (1);

(ii) a system of at least two peroxides comprising a first peroxide having a first 0.1 hour half-life temperature and a second peroxide having a second 0.1 hour half-life temperature, the first and second 0.1 hour half-life temperatures in said composition having a temperature differential of at least about 5° C.;

(iii) one or more thermoplastic polymers; and (iv) one or more crosslinking catalysts;

the composition optionally containing one or more additional components capable of inhibiting silane grafting and/or crosslinking during storage and/or optionally at least one additive.

In one specific embodiment herein, there is provided a silane-grafted thermoplastic polymer comprising a thermoplastic polymer grafted to one or more unsaturated silane compounds according to a process comprising subjecting a composition comprising (i) one or more unsaturated silane compounds, (ii) a system of at least two peroxides, and (iii) one or more thermoplastic polymers, to conditions suitable for grafting of the unsaturated silane compound to the thermoplastic polymer to form a silane-grafted thermoplastic polymer wherein:

the one or more unsaturated silane compounds are according to the Formula (1):

$$G^1R^1SiX^1X^2 \qquad (1)$$

wherein $G^1$ is an olefinically unsaturated hydrocarbon group, optionally heteroatom-substituted with one or more oxygen and/or nitrogen atoms; $R^1$ is selected from the group consisting of alkyl, aryl, aralkyl and arenyl; each of $X^1$ and $X^2$ is independently a hydrolyzable group or alternatively each of $X^1$ and $X^2$ is a hydrolyzable group having a direct bond to the silicon atom and also simultaneously a direct bond to each other to form a ring with the silicon atom of the unsaturated silane of Formula (1); and the system of at least two peroxides comprise a first peroxide having a first 0.1 hour half-life temperature and a second peroxide having a second 0.1 hour half-life temperature, the first and second 0.1 hour half-life temperatures in said composition having a temperature differential of at least about 5° C.

In another embodiment herein, there is provided a process for producing a silane-grafted thermoplastic polymer, the process comprising subjecting a composition comprising (i) one or more unsaturated silane compounds, (ii) a system of at least two peroxides, and (iii) one or more thermoplastic polymers, such as those described herein, to conditions suitable for grafting of the unsaturated silane compound to the thermoplastic polymer to form a silane-grafted thermoplastic polymer, wherein:

the one or more unsaturated silane compounds are according to the Formula (1):

$$G^1R^1SiX^1X^2 \qquad (1)$$

wherein $G^1$ is an olefinically unsaturated hydrocarbon group, optionally heteroatom-substituted with one or more oxygen and/or nitrogen atoms; $R^1$ is selected from the group consisting of alkyl, aryl, aralkyl and arenyl; each of $X^1$ and $X^2$ is independently a hydrolyzable group or alternatively each of $X^1$ and $X^2$ is a hydrolyzable group having a direct bond to the silicon atom and also simultaneously a direct bond to each other to form a ring with the silicon atom of the unsaturated silane of Formula (1); and the system of at least two peroxides comprising a first peroxide having a first 0.1 hour half-life temperature and a second peroxide having a second 0.1 hour half-life temperature, the first and second 0.1 hour half-life temperatures in said composition having a temperature differential of at least about 5° C. In one embodiment herein it will be understood that any of the temperature differentials described herein can be used in any embodiment herein that utilizes a system of at least two peroxides as herein described. In another embodiment herein, the process(es) of producing a silane-grafted thermoplastic polymer can further comprise subjecting the silane-grafted thermoplastic polymer to conditions suitable for crosslinking of the silane-grafted thermoplastic polymer to produce a crosslinked thermoplastic polymer. The conditions suitable for grafting of the crosslinkable unsaturated silane compound to the thermoplastic polymer comprise subjecting the crosslinkable formulation to a reaction temperature between about a melting temperature and about a degradation temperature of the thermoplastic polymer for a period of time suitable for the at least partial grafting of the crosslinkable unsaturated silane compound to the thermoplastic polymer. The aforementioned reaction temperature and/or any reaction temperature described herein can be in a range of specifically about 140° C. to about 260° C., more specifically about 160° C. to about 250° C. and most specifically about 180° C. to about 240° C.; and said period of time is specifically of from about 0.5 to about 10 minutes, more specifically of from about 1 to about 7 minutes and most specifically of from about 2 to about 5 minutes. In yet another embodiment herein, the conditions suitable for crosslinking of the silane-grafted thermoplastic polymer comprise subjecting the silane-grafted thermoplastic polymer to moisture and a crosslinking catalyst, such as the crosslinking catalysts described herein. The thermoplastic polymer in the process(es) herein can be any one or more of the herein described thermoplastic polymers. The unsaturated silane compound of Formula (1) in the process(es) described herein can specifically be any one or more of the herein described unsaturated silane compounds. The unsaturated silane compound of Formula (1) in the process(es) described herein can be any one or more of the unsaturated silane compounds of the Formula (2) as described herein. In another embodiment herein, the system of at least two peroxides described in any of the process(es) herein can be any one or more of the herein described system(s) of peroxides, and more specifically can contain temperature differentials between the first and second 0.1 hour half-life temperatures of the first and second peroxides in the herein described ranges. In a further embodiment, the first and second peroxides described in any of the process (es) herein can be any one or more of the herein described first and second peroxides respectively. In a further embodiment herein, any of the components present in the composition described herein can likewise be present in the process(es) and article(s) described herein.

In yet a further specific embodiment herein, there is provided a process for producing a crosslinked thermoplastic polymer, the process comprising: a) subjecting a composition comprising (i) one or more unsaturated silane compounds, (ii) a system of at least two peroxides, and (iii) one or more thermoplastic polymers, such as those described herein, to conditions suitable for grafting of the unsaturated silane compound to the thermoplastic polymer to form a silane-grafted thermoplastic polymer; and b) subjecting the silane-grafted thermoplastic polymer of step (a) to conditions suitable for crosslinking of the silane-grafted thermoplastic polymer to produce a crosslinked thermoplastic polymer; wherein: the one or more unsaturated silane compounds are according to the Formula (1):

$$G^1R^1SiX^1X^2 \qquad (1)$$

wherein $G^1$ is an olefinically unsaturated hydrocarbon group optionally heteroatom-substituted with one or more oxygen and/or nitrogen atoms; $R^1$ is selected from the group consisting of alkyl, aryl, aralkyl and arenyl; each of $X^1$ and $X^2$ is independently a hydrolyzable group or alternatively each of $X^1$ and $X^2$ is a hydrolyzable group having a direct bond to the silicon atom and also simultaneously a direct bond to each other to form a ring containing the silicon atom of the silane, such as the unsaturated silane compound of Formula (1); the system of at least two peroxides comprises a first peroxide having a first 0.1 hour half-life temperature and a second peroxide having a second 0.1 hour half-life temperature, the first and second 0.1 hour half-life temperatures in said composition having a temperature differential of at least about 5° C., or any of the other temperature differentials described herein;

the conditions for silane grafting according to step (a) and for crosslinking according to step (b) are the same or different, such as the conditions for silane grafting and crosslinking described herein, and optionally in one embodiment wherein steps (a) and (b) are conducted simultaneously or consecutively. The process(es) herein enables the crosslinking of thermoplastic polymer to be carried out under less critical processing conditions, such as controlling the temperature and residence time in a very narrow range, than those which are normally obtained in connection with conventional peroxide crosslinking techniques.

The process(es) herein therefore lends itself to the preparation of a crosslinked thermoplastic polymer in conventional extrusion equipment and under conditions and in a time comparable to those normally employed for the compounding of such materials. The improved grafting efficiency of the present disclosure decreases the requirement for expensive silane and peroxide.

In another embodiment, the present disclosure is directed to a process(es) for crosslinking thermoplastic polymers under reactive mechanical-working conditions that will minimize the occurrence of gel formation, screw-buildup and/or scorching during processing step (a) as described herein while maintaining high crosslinking efficiency. Any of the herein described process(es) can be conducted under reactive mechanical-working conditions and compositions described herein can be used in such processes and articles as described herein under reactive mechanical-working conditions.

In another embodiment, the present disclosure is directed to a process for crosslinking thermoplastic polymers under reactive mechanical-working conditions comprising: a) subjecting a crosslinkable formulation comprising (i) one or more unsaturated silane compounds, (ii) a system of at least two peroxides, and (iii) one or more thermoplastic polymers, to conditions suitable for grafting of the unsaturated silane compound to the thermoplastic polymer to form a silane-grafted thermoplastic polymer; and b) subjecting the silane-grafted thermoplastic polymer of step (a) to conditions suitable for crosslinking of the silane-grafted thermoplastic polymer to form a crosslinked thermoplastic polymer;
wherein:
the one or more unsaturated silane compounds are according to the Formula (1):

$$G^1R^1SiX^1X^2 \qquad (1)$$

wherein $G^1$ is an olefinically unsaturated hydrocarbon group optionally heteroatom-substituted with one or more oxygen and/or nitrogen atoms; $R^1$ is selected from the group consisting of alkyl, aryl, aralkyl and arenyl; each of $X^1$ and $X^2$ is independently a hydrolyzable group or alternatively each of $X^1$ and $X^2$ is a hydrolyzable group having a direct bond to the silicon atom and also simultaneously a direct bond to each other to form a ring with the silicon atom of the unsaturated silane of Formula (1);
the system of at least two peroxides comprise a first peroxide having a 0.1 hour first half-life temperature and a second peroxide having a second 0.1 hour half-life temperature, the first and second 0.1 hour half-life temperatures in said composition having a temperature differential of at least about 5° C.;
and wherein the conditions for silane grafting according to step (a) and for crosslinking according to step (b) are the same or different, and optionally in one embodiment, wherein steps (a) and (b) are conducted simultaneously or consecutively.

In one embodiment, the present disclosure employs a system of at least two peroxides possessing a range of 0.1 hour half-life temperatures such that undesired early and/or concentrated activation of the peroxides is decreased; and the broad range of half-life temperature allows for a controlled level of activation and grafting throughout the reactive process which leads to an improved level of grafting efficiency of the unsaturated silane compound to the thermoplastic polymer. In a further embodiment, in addition, the use of peroxides containing a range of 0.1 hour half-life temperatures reduces the level of gel formation, screw buildup and/or scorching allowing for extended run-times.

In one embodiment herein, in accordance with the process of this disclosure, the reaction between the thermoplastic polymer and the silane is carried out employing any suitable mechanical-working apparatus heretofore employed in the processing of thermoplastic polymers, e.g., a screw-type extruder, an internal Banbury mixer or a roll mill, provided, of course, that it results in bringing the composition to grafting temperature. The more specific apparatus for use in providing the crosslinkable polyolefin silane-graphed thermoplastic polymer of this disclosure is an extruder adapted to effect a kneading or compounding action on its contents. Such extruder apparatus may include such optional features as a heating jacket to augment the heat produced within the extruder barrel and a vacuum port whereby any unreacted silane and volatile components, such as decomposition products of the peroxide, alcohol, and the like, can be removed.

In one embodiment herein, the thermoplastic polymer, unsaturated silane compound(s), system of at least two peroxides and other components can be brought together by any convenient means. For example, the silane can be introduced into the apparatus in which the reaction is to take place dispersed on the surface of the thermoplastic polymer or it can be metered directly into the apparatus. The system of at least two peroxides can also be introduced by way of the surface of the thermoplastic polymer and, when possible, dissolved in the silane. The silane and/or peroxide components can also be introduced as "dry-silanes", which are unsaturated silanes of Formula (1), and/or at least two peroxides and optionally other additional components and/or additives of the composition(s), and/or process(es) and/or articles described herein which are absorbed on suitable mineral or organic carriers.

In one embodiment herein, reaction between the unsaturated silane and thermoplastic polymer can be carried out at any suitable temperature between about the melting and about the degradation temperature of the polyolefin. The actual reaction temperature employed will normally be determined by considerations of the type of apparatus in which the reaction is performed and where appropriate on the power input for the apparatus and the compound viscosity profile. When the thermoplastic polymer is polyethylene, it is desirable to perform the reaction at temperatures similar to those usually met during the processing of polyethylene, such as those temperatures and times described herein.

In one embodiment, crosslinking of thermoplastic polymer according to the process of this disclosure is accomplished in the presence of moisture. The moisture present in the atmosphere is usually sufficient to permit the crosslinking to occur but the rate of crosslinking may be hastened if desired by the use of an artificially moistened and optionally heated atmosphere, steam or liquid water.

In one embodiment, the present disclosure is applicable to all processes used for the manufacturing of silane crosslinkable compounds or products where the silane is grafted onto the polymer backbone using radical grafting. Some such non-limiting processes include the One-Step Monosil process, the One-Step XL-PEarl process, the One-Step Spherisil P process, the Two-Step Sioplas process, the One-Step Soaking process and combinations thereof.

In one embodiment, while any conventional method can be used to graft the unsaturated silane to the thermoplastic polymer, one specific method is blending the thermoplastic polymer(s) with the system of at least two peroxides and unsaturated silane in the first stage of a reactor extruder, such as a single screw extruder, specifically one with a length/diameter (L/D) ratio of specifically of about 25:1 or greater, more specifically of about 30:1 or greater and most specifically of about 38:1 or greater. The grafting conditions can vary greatly depending on the compound formulation, but the melt temperatures are specifically between about 160° and about 240° C., more specifically between about 210° and about 230° C., and most specifically between about 200° C. and about 220° C. depending upon the residence time and the half-life of the peroxides.

In one embodiment herein, the articles prepared from the crosslinked compositions of this disclosure can be filled or unfilled. If filled, then the amount of filler present should not exceed an amount that would cause degradation of the properties of interest in crosslinked composition, such as the herein-noted properties of reduced scorch, reduced gel formation, reduced screw buildup, improved melt index, and the like. The amount of filler present is specifically between from about 0.1 and about 80 weight percent, and more specifically between about 20 and about 60 weight percent based on the total weight of the composition. Some representative fillers include the non-limiting examples of kaolin clay, magnesium hydroxide, aluminum trihydroxide, silica and calcium carbonate. When filler is present, the filler can be coated with a material that will prevent or retard any tendency that the filler might otherwise have to interfere with the silane cure reaction. Stearic acid or silane coupling agents are non-limiting examples of such a filler coating.

In one embodiment herein there is provided an article, produced by a process comprising: a) providing a composition comprising: (i) one or more unsaturated silane compounds according to the Formula (1):

$$G^1R^1SiX^1X^2 \qquad (1)$$

wherein $G^1$ is an olefinically unsaturated hydrocarbon group, optionally heteroatom-substituted with one or more oxygen and/or nitrogen atoms; $R^1$ is selected from the group consisting of alkyl, aryl, aralkyl and arenyl; each of $X^1$ and $X^2$ is independently a hydrolyzable group or alternatively each of $X^1$ and $X^2$ is a hydrolyzable group having a direct bond to the silicon atom and also simultaneously a direct bond to each other to form a ring containing the silicon atom of the unsaturated silane of Formula (1), such as in Formula (2) described herein;

(ii) a system of at least two peroxides comprising a first peroxide having a first 0.1 hour half-life temperature and a second peroxide having a second 0.1 hour half-life temperature, or any one or more of the other systems of peroxides described herein, the first and second 0.1 hour half-life temperatures in said composition having a temperature differential of at least about 5° C.; and (iii) one or more thermoplastic polymers, such as any of the herein described thermoplastic polymers;

b) subjecting the composition of step (a) to conditions suitable for grafting of the unsaturated silane compound to the thermoplastic polymer to form a silane-grafted thermoplastic polymer, such as those described herein;

c) subjecting the silane-grafted thermoplastic polymer of step (b) to conditions suitable for crosslinking of the silane-grafted thermoplastic polymer, such as those described herein, to form a crosslinked thermoplastic polymer; and, d) producing the article therefrom before, and/or during and/or after conducting step (c), wherein the conditions for silane grafting according to step (b) and for crosslinking according to step (c) are the same or different, and optionally in one embodiment, wherein steps (b) and (c) are conducted simultaneously or consecutively.

The article described herein can be a molded article wherein the composition can be more specifically provided to a mold after subjecting the composition to grafting conditions and before subjecting the composition to crosslinking conditions.

In one embodiment, additives can be used in the preparation of and be present in the articles prepared from the crosslinked thermoplastic compositions described herein, and includes the non-limiting examples of antioxidants, processing aids, oils, plasticizers, colorants, pigments and lubricants.

In one embodiment, the amounts of the components described herein can vary greatly depending on the nature of the thermoplastic polymer (e.g. polyolefin) and other components and the process of production of articles made from the crosslinked thermoplastic polymers (e.g., silane crosslinked polyolefin(s)). The unsaturated silane of the general Formula (1) can comprise of specifically of from about 0.1 to about 10 weight percent, more specifically of from about 0.3 to about 3 weight percent and most specifically of from about 0.5 to about 2.0 weight percent based upon the total weight of the composition (crosslinkable formulation) containing the thermoplastic polymer, unsaturated silane, at least two peroxides and optionally the catalyst(s), stabilizer(s), processing aid(s) and metal deactivator(s). The unsaturated silane of the general Formula (2) can be present in the amount described above for Formula (1). It will be understood herein that Formula (2) is a more specific embodiment of Formula (1).

In one embodiment, the system of at least two peroxides will vary in amount as described above, depending on the desired range of peroxide half-life temperatures and times. The amount of the system of at least two peroxides can be varied over a wide range, such as the non-limiting examples, of from about 0.01 to about 0.4 weight percent, more specifically from about 0.02 to about 0.2 weight percent and most specifically from about 0.05 to about 0.1 weight percent, based upon the total weight of the composition (crosslinkable formulation) containing the thermoplastic polymer, unsaturated silane, at least two peroxides and optionally the catalyst(s), stabilizer(s), processing aid(s) and metal deactivator(s).

In one embodiment herein the amount of thermoplastic polymer in the composition (crosslinkable formulation) comprising polymer, unsaturated silane, at least two peroxides and optionally the catalyst(s), stabilizer(s), processing aid(s) and metal deactivator(s) can comprise specifically of from about 97.0 to about 99.8 weight percent, more specifically of from about 97.5 to about 99.5 weight percent and most specifically of from about 98.0 to about 99 weight percent based on the total weight of the composition (crosslinkable formulation).

In one embodiment, the catalyst(s) used to accelerate the crosslinking of the silane-graphed thermoplastic polymer, if utilized herein, will typically be present in the amount of from 0.01 to about 1.0 weight percent, more specifically from 0.05 to about 0.5 weight percent and most specifically from about 0.1 to about 0.2 weight percent, based upon the total weight of the composition (crosslinkable formulation) containing the thermoplastic polymer, unsaturated silane, at least two peroxides, catalyst(s) and optionally the, stabilizer(s), processing aid(s) and metal deactivator(s).

In one embodiment, the unsaturated silane(s) of Formula (1) and system of at least two peroxides will be premixed to form a mixture, optionally containing the catalyst(s), stabilizer(s), processing aid(s) and metal deactivator(s), and this mixture of will be used at loading levels of specifically from about 0.1 to about 10, more specifically of from about 0.3 to about 3 and most specifically of from about 0.5 to about 2.0 weight percent of the total composition (crosslinkable formulation) containing the thermoplastic polymer, unsaturated silane, at least two peroxides and optionally the catalyst(s), stabilizer(s), processing aid(s) and metal deactivator(s).

The mixture comprising the silane(s) for Formula (1), system of at least two peroxides and optionally containing the catalyst(s), stabilizer(s), processing aid(s) and metal deactivator(s), shall specifically be characterized by the unsaturated silane being present in amounts of specifically from about 50 to about 99 weight percent, more specifically from about 75 to about 95 weight percent and most specifically of from about 85 to about 92 weight percent of the total mixture. The amount of peroxides that are pre-blended to form a mixture with the unsaturated silane of Formula (1) and optionally the catalyst(s), stabilizer(s), processing aid(s) and metal deactivator(s) will be in total weight of the mixture of specifically from about 0.5 to about 15 weight percent and more specifically from about 2 to about 8 weight percent, and most specifically of from about 3 to about 5 weight percent. In one embodiment, the level of crosslinking catalysts will vary in amount as described above, depending on the desired rate for crosslinking silane-graphed thermoplastic polymer. Specifically, herein the crosslinking catalysts can be present in the mixture of unsaturated silane, at least two peroxides and optionally stabilizer(s), processing aid(s) and metal deactivator(s) in an amount of specifically from 0.001 to about 10 weight percent, more specifically of from about 0.5 to about 5 weight and most specifically of from about 1.0 to about 2.0 weight percent based on the total weight of the mixture. The amount of one or more peroxide inhibitors and/or stabilizers in the mixture of unsaturated silane, at least two peroxides and optionally the catalyst(s), processing aid(s) and metal deactivator(s) can comprise specifically of from about 0.1 to about 10 weight percent, more specifically of from about 1.0 to about 5.0 weight percent and most specifically of from about 2.0 to about 3.0 weight percent based on the total weight of the mixture.

In one embodiment herein the total level of additives, including processing aids and metal deactivators, in the mixture of unsaturated silane, at least two peroxides and optionally the catalyst(s), and stabilizer(s), as described above, can each specifically be included, in amounts of specifically from about 0.001 to about 25 weight percent, more specifically of from about 0.5 to about 5 weight percent and most specifically of from about 1.0 to about 3.0 weight percent, based on the total weight of the mixture.

In one embodiment, the mixture comprising the unsaturated silane of Formula (2), the system of at least two peroxides, and optionally containing the catalyst(s), stabilizer(s), processing aid(s) and metal deactivator(s) shall specifically be characterized by the unsaturated silane being present in amounts of specifically from about 50 to about 99 weight percent, more specifically from about 75 to about 95 weight percent and most specifically of from about 85 to about 92 weight percent of the total mixture. In another embodiment herein, the amount of peroxides that are pre-blended to form a mixture with the unsaturated silane of Formula (1) and optionally the catalyst(s), stabilizer(s), processing aid(s) and metal deactivator(s) will be in total weight of the mixture of specifically from about 0.5 to about 15 weight percent and more specifically from about 2 to about 8 weight percent, and most specifically of from about 3 to about 5 weight percent. In one embodiment, the level of crosslinking catalysts will vary in amount as described above, depending on the desired rate for crosslinking silane-grafted thermoplastic polymer. Specifically, in one embodiment herein the crosslinking catalysts can be present in the mixture of unsaturated silane, at least two peroxides and optionally stabilizer(s), processing aid(s) and metal deactivator(s) in an amount of specifically from 0.001 to about 10 weight percent, more specifically of from about 0.5 to about 5 weight and most specifically of from about 1.0 to about 2.0 weight percent based on the total weight of the mixture. In one embodiment said mixture can further comprise peroxide inhibitor in the amount of one or more peroxide inhibitors and/or stabilizers in the mixture of unsaturated silane, at least two peroxides and optionally the catalyst(s), processing aid(s) and metal deactivator(s) can comprise specifically of from about 0.1 to about 10 weight percent, more specifically of from about 1.0 to about 5.0 weight percent and most specifically of from about 2.0 to about 3.0 weight percent based on the total weight of the mixture. In one embodiment herein the total level of additives, including processing aids and metal deactivators, in the mixture of unsaturated silane, at least two peroxides and optionally the catalyst(s), and stabilizer(s), as described above, can each specifically be included, in amounts of specifically from about 0.001 to about 25 weight percent, more specifically of from about 0.5 to about 5 weight percent and most specifically of from about 1.0 to about 3.0 weight percent, based on the total weight of the mixture.

In one embodiment, a mixture comprising the unsaturated silane of Formula (2), a single (first or second) peroxide and optionally catalyst(s), stabilizer(s), processing aid(s) and metal deactivator(s) can have better shelf stability. This mixture having only one peroxide (first or second) achieves better shelf-stability, because the stabilizer(s) used to prevent premature activation of the peroxide can be specifically chosen to match the reactivity of the single peroxide in the mixture. The remaining peroxide not yet used (first or second depending on which was used first) of the at least two peroxides can be added to the mixture just prior to use or added to the mechanical working apparatus separately from the mixture containing the silane, the single peroxide (first or second) and other optional additional components or additives as described herein, wherein in the situation of the addition of the remaining peroxide to the mechanical working apparatus would then comprise the composition as described herein.

In one embodiment, the mixture comprising the unsaturated silane of Formula (2), a single peroxide (first or second), and optionally the catalyst(s), stabilizer(s), processing aid(s) and metal deactivator(s) shall specifically be characterized by the unsaturated silane being present in amounts of specifically from about 50 to about 99 weight percent, more specifically from about 75 to about 95 weight percent and most specifically of from about 85 to about 92 weight percent of the total mixture. In another embodiment herein, the amount of a single peroxide (first or second) that is pre-blended to form a mixture with the unsaturated silane of Formula (2) and optionally the catalyst(s), stabilizer(s), processing aid(s) and metal deactivator(s) will be in total weight of the mixture of specifically from about 0.5 to about 15 weight percent and more specifically from about 2 to about 8 weight percent, and most specifically of from about 3 to about 5 weight percent. In one embodiment, the level of crosslinking catalyst will vary in amount as described above, depending on the desired rate for crosslinking silane-grafted thermoplastic polymer. Specifically, in one embodiment herein the crosslinking catalysts can be present in the mixture of unsaturated silane, the single peroxide (first or second) and optionally stabilizer(s), processing aid(s) and metal deactivator(s) in an amount of specifically from 0.001 to about 10 weight percent, more specifically of from about 0.5 to about 5 weight and most specifically of from about 1.0 to about 2.0 weight percent based on the total weight of the mixture. In one embodiment the amount of one or more peroxide inhibitors and/or stabilizers in the mixture of unsaturated silane, a single peroxide (first or second) and optionally the catalyst(s), processing aid(s) and metal deactivator(s) can comprise specifically of from about 0.1 to about 10 weight percent, more specifically of from about 1.0 to about 5.0 weight percent and most specifically of from about 2.0 to about 3.0 weight percent based on the total weight of the mixture. In one embodiment herein the total level of additives, including processing aids and metal deactivators, in the mixture of unsaturated silane, a single peroxide (first or second) and optionally the catalyst(s), and stabilizer(s), as described above, can each specifically be included, in amounts of specifically from about 0.001 to about 25 weight percent, more specifically of from about 0.5 to about 5 weight percent and most specifically of from about 1.0 to about 3.0 weight percent, based on the total weight of the mixture. It will be understood herein that mixture comprising only one peroxide (first or second) as described herein will have the remaining peroxide (first or second respectively) added prior to the formation of the composition as it is understood herein.

In one embodiment herein, the compositions, processes and articles described herein can be used in wire and cable insulation, weatherstripping, fibers, seals, gaskets, foams, footware, flexible tubing, pipes, bellows, tapes and combinations thereof as well as other applications.

The following examples are illustrative of the process herein for preparing unsaturated silanes of Formula (2), for preparing mixtures of unsaturated silanes, systems of peroxides, and optionally catalysts, stabilizer(s), processing aid(s) and metal deactivator(s), for preparing compositions (crosslinkable formulations) containing unsaturated silanes, systems of peroxides, thermoplastic polymers and optionally catalysts, stabilizer(s), processing aid(s) and metal deactivator(s) and crosslinked compositions of thermoplastic polymers.

EXAMPLE 1

2,4,4,6-Tetramethyl-2-vinyl-[1,3,2]dioxasilinane can be prepared by adding vinylmethyldimethoxysilane (132.2 grams, 1.0 mole) into a 500 ml round bottom flask. Sulfuric acid (0.47 grams) can be added to the reaction flask and 2-methyl-2,4-pentanediol (118.2 grams, 1 mole) can be added using an addition funnel. The flask can be heated to 50° C. under a vacuum of 50 torr. Methanol can then be collected. A 21% ethanolic solution of sodium ethoxide (3.5 grams) is added to neutralize the acid and then stripped under reduced pressure to remove any ethanol that may be present.

EXAMPLE 2

An extrusion molding grade of polyethylene pellets (Escorene LD 166 BA, available from Exxon Mobile Chemical Company) having a melt flow index of 0.2 g/10 min at 190° C. under a load of 2.16 kg and density of 0.922 g/cm$^3$ (100 parts by weight polymer) can be coated by tumbling with a mixture (1.2 parts by weight polymer) composed of 92.0 weight percent vinylmethyldimethoxysilane 2.5 weight percent 1,1-bis-(tert-butyl peroxy)-3,3,5-trimethylcyclohexane having a 0.1 hour half-life temperature of 128° C., 2.5 weight percent di-tert-butyl peroxide having a 0.1 hour half-life temperature of 164° C. and 3 weight percent dibutyltin dilaurate crosslinking catalyst, until all of the liquid is taken up. The composition can then be extruded in a single screw extruder under the following conditions:

Temperature of screw: 60° C.
Temperature of barrel zone 1: 170° C.
Temperature of barrel zone 2: 220° C.
Screw speed: 20 rotations per minute (rpm)
The residence time of the polyethylene in the machine can be approximately 1 to 2 minutes.

EXAMPLE 3

A composition (crosslinkable formulation) can be prepared by mixing 9.88 kilograms of polyethylene and 0.12 kilograms of a mixture composed of unsaturated silane, two peroxides and a catalyst. The base polyethylene resin can be Escorene LD 166 BA, available from Exxon Mobile Chemical Company with a melt flow index of 0.2 g/10 min at 190° C. under a load of 2.16 kg, and a density of 0.922 g/dm³. The mixture can be prepared by charging 111 grams of the silane from Example 1 into a 250 ml three neck round bottom flask equipped with a mechanical stirrer, dry nitrogen line and funnel. To which can be added 1,1-bis-(tert-butyl peroxy)-3,3,5-trimethylcyclohexane having a 0.1 hour half-life temperature of 128° C. (2.8 grams), di-tert-butyl peroxide having a 0.1 hour half-life temperature of 164° C. (2.8 grams) and dibutyltin dilaurate (3.3 grams) slowly with stirring.

The mixture of reactants can be pre-soaked onto the polymer pellets prior to feeding into the extruder by mixing at room temperature for 4 hours. The thermoplastic polymer formulation can then be extruded on a Troester single screw extruder equipped with a barrier screw of a diameter of 45 millimeters (mm) and a length of 25 L/D. A breaker plate can be absent and the screw speed can be set at 20 rotations per minute (rpm). The feeding zone and screw can then be respectively cooled to 50° C. and 60° C. The barrel temperatures can be set at 150° C. for the first zone with a regular temperature increase in each of the zones so that the temperature in the last zone is 220° C. The resulting melt temperature can then be measured in the polymer.

EXAMPLE 4

A composition (crosslinkable formulation) can be prepared by mixing 10.40 kilograms of polyethylene, 0.35 kilograms of a carbon black (N339 available from Continental Carbon) and 0.12 kilograms of a mixture composed of unsaturated silane, two peroxides, stabilizer and catalyst. The base polyethylene resin can be Escorene LD 166 BA, available from Exxon Mobile Chemical Company with a melt flow index of 0.2 g/10 min at 190° C. under a load of 2.16 kg, and a density of 0.922 g/dm³. The mixture can be prepared by charging 108 grams of the silane from Example 1 into a 250 ml three neck round bottom flask equipped with a mechanical stirrer, dry nitrogen and funnel. 1,3,5-Trimethyl-2,4,6-tris(3,5-di-tert-butyl-4-hydroxybenzyl)benzene (3.0 grams), bis-2,4-dichlorobenzoyl)peroxide have a 0.1 hour half-life of 93° C. (2.8 grams), tert-butyl cumyl peroxide having a 0.1 hour half-life of 154° C. (2.8 grams) and dibutyltin dilaurate (3.3 grams) can then be slowly added with stirring. The mixture of reactants can be pre-soaked onto the polymer pellets prior to feeding into the extruder by mixing at room temperature for 4 hours. The thermoplastic polymer formulation can then be extruded on a Troester single screw extruder equipped with a barrier screw of a diameter of 45 millimeters (mm) and a length of 25 L/D. A breaker plate can be absent and the screw speed can be set at 20 rotations per minute (rpm). The feeding zone and screw can be respectively cooled to 50° C. and 60° C. The barrel temperatures can be set at 150° C. for the first zone with a regular increase in each of the zones so that the temperature in the last zone is 220° C. The resulting melt temperature can then be measured in the polymer. The crosslinkable silane-graphed thermoplastic can then be extruded through a die at the end of the single screw extruder to form a pipe.

The pipe composed of the crosslinkable silane-graphed thermoplastic polymer can then soaked in 80° C. water for 48 hours to form the crosslinked article.

EXAMPLE 5

A shelf-stable mixture containing only a single peroxide can be prepared by charging 108 grams of the silane from Example 1 into a 250 ml three neck round bottom flask equipped with a mechanical stirrer, dry nitrogen line and funnel. 1,3,5-Trimethyl-2,4,6-tris(3,5-di-tert-butyl-4-hydroxybenzyl)benzene (3.0 grams), tert-butyl cumyl peroxide having a 0.1 hour half-life of 154° C. (5.6 grams) and dibutyltin dilaurate (3.3 grams) can be slowly added with stirring. The mixture can then be removed from the flask and stored under nitrogen in a 250 ml brown bottle. This mixture can then be mixed with dibenzoyl peroxide have a 0.1 hour half-life of 113° C. (5.6 grams) prior to being extruded as indicated above.

While the invention has been described in detail in connection with specific embodiments thereof, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be limited by the foregoing description.

The invention claimed is:

1. A composition comprising:
   (i) one or more unsaturated silane compounds according to the Formula (2):

$$G^1R^1SiZ \qquad (2)$$

wherein $G^1$ is vinyl; $R^1$ is methyl; Z is a divalent hydrolyzable group containing of from 2 to 30 carbon atoms that forms a cyclic structure with the silicon atom of Formula (2) and has the general Formula (3)

$$—O(R^2CR^2)_cO— \qquad (3)$$

wherein each occurrence of $R^2$ is independently hydrogen or $R^1$; and c is an integer of from 2 to 3;
   and
   (ii) a system of at least two peroxides comprising a first peroxide having a first 0.1 hour half-life temperature and a second peroxide having a second 0.1 hour half-life temperature, the first and second 0.1 hour half-life temperatures in said composition having a temperature differential of from about 5° C. to about 110° C.

2. The composition of claim 1, wherein the Z group is selected from the group consisting of 2,3-butanedioxy, 2-methyl-1,2propanedioxy, 2,2-dimethyl-1,3-propanedioxy, 2-methyl-2,4-pentanedioxy, 2,3dimethyl-2,3-butanedioxy and 2,4-dimethyl-2,4-pentanedioxy.

3. The composition of claim 1, wherein the first peroxide is selected from the group consisting of bis-(2,4-dichlorobenzoyl)peroxide, tert-butylperoxypivalate, dilauroyl peroxide, dibenzoyl peroxide, tert-butylperoxy-2-ethylhexanoate, 1,1-bis-(tert-butylperoxy)-3,3,5-trimethylcyclohexane, bis-(tert-butylperoxy)cyclohexane, tert-butyl peroxy-3,5,5-trimethyl-hexanoate, tert-butylperoxyacetate, tert-butylperoxybenzoate, di-tert-amyl peroxide, dicumylperoxide, bis-(tert-butyl peroxyisopropyl)benzene, 2,5-dimethyl-2,5-di(tert-butylperoxy)hexane and combinations thereof; and the second peroxide is selected from the group consisting of tert-butylperoxyacetate, tert-butylperoxybenzoate, di-tert-amyl peroxide, dicumylperoxide, bis(tert-butylperoxyisopropyl)benzene, 2,5-dimethyl-2,5-bis-(t-butylperoxy)hexane, tert-butylcumyl peroxide, 2,5-dimethyl-2,5-bis-(t-butylperoxy)-3-hexyne, di-tert-butylperoxide and combinations thereof; wherein at least one first peroxide is different from at least one second peroxide.

4. A composition comprising:
(i) one or more unsaturated silane compounds according to the Formula (2):

$G^1R^1SiZ$ (2)

wherein $G^1$ is vinyl $R^1$ methyl Z is a divalent hydrolyzable group containing of from 2 to 30 carbon atoms that forms a cyclic structure with the silicon atom of Formula (2) and has the general Formula (3)

—O(R²CR²)$_c$O— (3)

wherein each occurrence of $R^2$ is independently hydrogen or $R^1$; and c is an integer of from 2 to 3;
(ii) a system of at least two peroxides comprising a first peroxide having a first 0.1 hour half-life temperature and a second peroxide having a second 0.1 hour half-life temperature, the first and second 0.1 hour half-life temperatures having a temperature differential in said composition of from about 5° C. to about 110° C. and
(iii) one or more thermoplastic polymers; and
(iv) one or more crosslinking catalysts;
the composition optionally containing one or more additional components.

5. The composition of claim 4, wherein the Z group is selected from the group consisting of 2,3-butanedioxy, 2-methyl-1,2-propanedioxy, 2,2-dimethyl-1,3-propanedioxy, 2-methyl-2,4-pentanedioxy, 2,3-dimethyl-2,3-butanedioxy and 2,4-dimethyl-2,4-pentanedioxy.

6. The composition of claim 4, wherein the one or more thermoplastic polymers are selected from the group consisting of high-pressure low-density polyethylene, medium- or low-pressure high-density polyethylene, low-pressure low-density polyethylene, medium-density polyethylene, ethylene-α-olefin copolymers, polypropylene, ethylene-ethyl acrylate copolymers, ethylene-vinyl acetate copolymers, ethylene-propylene copolymers, ethylene-propylene-diene terpolymers, ethylene-butene copolymers, polymethylpentene, polybutenes, chlorinated polyethylenes, chlorinated ethylene-vinyl acetate terpolymers, and combinations thereof.

7. A silane-grafted thermoplastic polymer comprising a thermoplastic polymer grafted to one or more unsaturated silane compounds according to a process comprising subjecting a composition comprising (i) one or more unsaturated silane compounds, (ii) a system of at least two peroxides, and (iii) one or more thermoplastic polymers, to conditions suitable for grafting of the unsaturated silane compound to the thermoplastic polymer to form a silane-grafted thermoplastic polymer, wherein:
the one or more unsaturated silane compounds are according to the Formula (2):

$G^1R^1SiZ$ (2)

wherein $G^1$ is vinyl; $R^1$ is methyl; Z is a divalent hydrolyzable group containing of from 2 to 30 carbon atoms that forms a cyclic structure with the silicon atom of Formula (2) and has the general Formula (3)

—O(R²CR²)$_c$O— (3)

wherein each occurrence of $R^2$ is independently hydrogen or $R^1$; and c is an integer of from 2 to 3; and
the system of at least two peroxides comprises a first peroxide having a first 0.1 hour half-life temperature and a second peroxide having a second 0.1 hour half-life temperature, the first and second 0.1 hour half-life temperatures in said composition having a temperature differential of at least about 5° C.

8. The composition of claim 7, wherein the Z group is selected from the group consisting of 2,3-butanedioxy, 2-methyl-1,2-propanedioxy, 2,2-dimethyl-1,3-propanedioxy, 2-methyl-2,4-pentanedioxy, 2,3-dimethyl-2,3-butanedioxy and 2,4-dimethyl-2,4-pentanedioxy.

9. A process for producing a silane-grafted thermoplastic polymer, the process comprising subjecting a composition comprising (i) one or more unsaturated silane compounds, (ii) a system of at least two peroxides, and (iii) one or more thermoplastic polymers, to conditions suitable for grafting of the unsaturated silane compound to the thermoplastic polymer to form a silane-grafted thermoplastic polymer, said conditions including subjecting the composition to a reaction temperature of from about 140° C. to about 260° C. for a period of time of from about 0.5 minutes to about 10 minutes, wherein:
the one or more unsaturated silane compounds are according to the Formula (2)

$G^1R^1SiZ$ (2)

wherein $G^1$ is vinyl; $R^1$ is methyl; Z is a divalent hydrolyzable group containing of from 2 to 30 carbon atoms that forms a cyclic structure with the silicon atom of Formula (2) and has the general Formula (3)

—O(R²CR²)$_c$O— (3)

wherein each occurrence of $R^2$ is independently hydrogen or $R^1$; and c is an integer of from 2 to 3; and
the system of at least two peroxides comprising a first peroxide having a first 0.1 hour half-life temperature and a second peroxide having a second 0.1 hour half-life temperature, the first and second 0.1 hour half-life temperatures in said composition having a temperature differential of from about 5° C. to about 110° C.

10. The process of claim 9, further comprising subjecting the silane-grafted thermoplastic polymer to conditions suitable for crosslinking of the silane-grafted thermoplastic polymer to produce a crosslinked thermoplastic polymer, said conditions including contacting the silane grafted thermoplastic polymer with moisture and a crosslinking catalyst.

11. The process of claim 9, wherein the one or more polyolefins are selected from the group consisting of high-pressure low-density polyethylene, medium- or low-pressure high-density polyethylene, low-pressure low-density polyethylene, medium-density polyethylene, ethylene-α-olefin copolymers, polypropylene, ethylene-ethyl acrylate copolymers, ethylene-vinyl acetate copolymers, ethylene-propylene copolymers, ethylene-propylene-diene terpolymers, ethylene-butene copolymers, polymethylpentene, polybutenes, chlorinated polyethylenes, chlorinated ethylene-vinyl acetate terpolymers, and combinations thereof.

12. The process of claim 9, wherein the Z group is selected from the group consisting of 2,3-butanedioxy, 2-methyl-1,2- propanedioxy,2,2-dimethyl-1,3-propanedioxy, 2-methyl-2,4-pentanedioxy, 2,3-dimethyl-2,3-butanedioxy and 2,4-dimethyl-2,4-pentanedioxy.

13. The process of claim 9, wherein the first peroxide is selected from the group consisting of bis-(2,4-dichlorobenzoyl)peroxide, tert-butylperoxypivalate, dilauroyl peroxide, dibenzoyl peroxide, tert-butylperoxy-2-ethylhexanoate, 1,1-bis-(tert-butylperoxy)-3,3,5-trimethylcyclohexane, bis-(tert-butylperoxy)cyclohexane, tert-butyl peroxy-3,5,5-trimethylhexanoate, tert-butylperoxyacetate, tert-butylperoxybenzoate, di-tert-amyl peroxide, dicumylperoxide, bis-(tert-butyl peroxyisopropyl)benzene, 2,5-dimethyl-2,5-di(tert-butylperoxy)hexane and combinations thereof; and the second peroxide is selected from the group consisting of tert-butylperoxyacetate, tert-butylperoxybenzoate, di-tert-amyl peroxide, dicumylperoxide, bis(tert-butylperoxyisopropyl)benzene, 2,5-dimethyl-2,5-bis-(t-butylperoxy)hexane, tert-butylcumyl peroxide, 2,5-dimethyl-2,5-bis-(t-butylperoxy)-3-hexyne, di-tert-butylperoxide and combinations thereof; wherein at least one first peroxide is different from at least one second peroxide.

14. An article produced by a process comprising:
a) providing a composition comprising:
(i) one or more unsaturated silane compounds according to the Formula (2):

$$G^1R^1SiZ \qquad (2)$$

wherein $G^1$ is vinyl $R^1$ is methyl Z is a divalent hydrolyzable group containing of from 2 to 30 carbon atoms that forms a cyclic structure with the silicon atom of Formula (2) and has the general Formula (3)

$$—O(R^2CR^2)_cO— \qquad (3)$$

wherein each occurrence of $R^2$ is independently hydrogen or $R^1$; and c is an integer of from 2 to 3;
(ii) a system of at least two peroxides comprising a first peroxide having a first 0.1 hour half-life temperature and a second peroxide having a second 0.1 hour half-life temperature, the first and second 0.1 hour half-life temperatures in said composition having a temperature differential of from about 5° C. to about 110° C.; and
(iii) one or more thermoplastic polymers;
b) subjecting the composition of step (a) to conditions suitable for grafting of the unsaturated silane compound to the thermoplastic polymer to form a silane-grafted thermoplastic polymer;
c) subjecting the silane-grafted thermoplastic polymer of step (b) to conditions suitable for crosslinking of the silane-grafted thermoplastic polymer to form a crosslinked thermoplastic polymer; and,
d) producing the article therefrom before, and/or during and/or after conducting step (c), wherein the conditions for silane grafting according to step (b) and for crosslinking according to step (c) are the same or different, and wherein steps (b) and (c) are conducted simultaneously or consecutively.

* * * * *